United States Patent
Jaeger et al.

(10) Patent No.: US 9,423,051 B2
(45) Date of Patent: Aug. 23, 2016

(54) DISPENSING CARBONATED BEVERAGES FROM A CLOSED PACKAGE

(75) Inventors: Hans Jaeger, Thunstetten (CH); Alain Saurer, Neuchatel (CH)

(73) Assignee: The Coca-Cola Company, Atlanta, GA (US)

( * ) Notice: Subject to any disclaimer, the term of this patent is extended or adjusted under 35 U.S.C. 154(b) by 922 days.

(21) Appl. No.: 13/588,601

(22) Filed: Aug. 17, 2012

(65) Prior Publication Data

US 2014/0048144 A1 Feb. 20, 2014

(51) Int. Cl.
*B67D 1/00* (2006.01)
*F16K 39/02* (2006.01)
*B67D 1/04* (2006.01)

(52) U.S. Cl.
CPC ............ *F16K 39/026* (2013.01); *B67D 1/0418* (2013.01); *Y10T 137/0396* (2015.04); *Y10T 137/2984* (2015.04); *Y10T 137/2987* (2015.04); *Y10T 137/7793* (2015.04); *Y10T 137/7795* (2015.04)

(58) Field of Classification Search
CPC ..... F16K 39/026; F16K 31/36; B67D 1/0418; Y10T 137/261; Y10T 137/2607; Y10T 137/2605; Y10T 137/2993; Y10T 137/299; Y10T 137/2987; Y10T 137/2984; Y10T 137/7795; Y10T 137/87241; Y10T 137/87225; Y10T 137/0385; Y10T 137/0396; Y10T 137/7793
USPC ................. 137/170.1–170.4, 505.12, 596.18, 137/596.2, 115.13, 116.3, 116.5, 12.5, 14, 137/505; 222/400.7, 61, 82, 399, 334
See application file for complete search history.

(56) References Cited

U.S. PATENT DOCUMENTS

| | | | | |
|---|---|---|---|---|
| 3,191,644 A * | 6/1965 | Hollifield | ...................... | 141/302 |
| 3,219,236 A * | 11/1965 | Radcliffe | ............. | B67D 1/0406 |
| | | | | 137/505.44 |
| 3,325,053 A * | 6/1967 | De Boer et al. | .................... | 222/5 |
| 3,583,601 A * | 6/1971 | Ayers | .................. | 222/1 |
| 4,143,793 A * | 3/1979 | McMillin et al. | ................. | 222/1 |
| 4,160,512 A * | 7/1979 | Cleland | ........................... | 222/56 |
| 4,928,850 A * | 5/1990 | Fallon et al. | ...................... | 222/3 |
| 6,125,887 A * | 10/2000 | Pinto | ............................. | 137/884 |
| 6,820,763 B2 * | 11/2004 | Bilskie et al. | ................... | 222/61 |
| 8,141,746 B2 * | 3/2012 | Lambrecht | ..................... | 222/152 |
| 2006/0243752 A1* | 11/2006 | Pakkert et al. | ................ | 222/399 |
| 2007/0148062 A1* | 6/2007 | Haas | .................... | B01J 19/0006 |
| | | | | 422/603 |

(Continued)

FOREIGN PATENT DOCUMENTS

| JP | 2000025894 | 7/1998 |
|---|---|---|
| JP | 2003072892 | 8/2001 |
| WO | WO 2008/060152 A1 | 5/2008 |

(Continued)

*Primary Examiner* — Craig J Price
(74) *Attorney, Agent, or Firm* — King & Spalding LLP

(57) ABSTRACT

A mechanism to dispense a carbonated beverage from a closed package may include reducing a pressure of a gas from a cartridge using one or more pressure regulators coupled to the cartridge. Further, the flow rate of the gas having the reduced pressure may be regulated using a flow regulator coupled to the one or more pressure regulators. The flow regulator may be coupled to a dispensing head comprising a sequential arrangement of a snifting valve and a dispensing valve. Using the sequential arrangement, the gas whose flow rate is regulated may be released into the closed package to dispense a carbonated beverage in the closed container at a controlled rate to minimize a foaming.

20 Claims, 6 Drawing Sheets

(56) References Cited

U.S. PATENT DOCUMENTS

2011/0042418 A1* 2/2011 Lambrecht .................... 222/152
2011/0240019 A1* 10/2011 Fine ...................... A61M 16/12
                                                    128/202.26

FOREIGN PATENT DOCUMENTS

| WO | WO 2008/060157 A1 | 5/2008 |
| WO | WO 2008/072240 A2 | 6/2008 |
| WO | WO 2011/134929 A2 | 11/2011 |

* cited by examiner

DISPENSING CARBONATED BEVERAGES FROM A CLOSED PACKAGE

FIELD OF TECHNOLOGY

This disclosure relates generally to dispensing beverages and, in one example embodiment, to a system, method and an apparatus for dispensing carbonated beverages from a closed package.

BACKGROUND

Freshness of a carbonated beverage may be associated with a carbonation level of the carbonated beverage. Carbonated beverages may be more enjoyable when each serving maintains a desired carbonation level. Carbonated beverage fountains may be able to provide a consistent carbonation level with each serving. Such fountain installments may be ideal for environments such as restaurants, offices, etc. However, a fountain installment may be impractical, cost prohibitive and space prohibitive for at home consumption of the carbonated beverage, as an example.

Consumers may be more likely to purchase multi-serve packages of carbonated beverages for at home consumption. For example, consumers may purchase 2 liter bottles of carbonated beverages for at home consumption purposes. However, in traditional multi-serve packages, with each serving of the carbonated beverage a carbonation level of the carbonated beverage reduces and eventually the carbonated beverage may become flat (e.g., low carbonation levels). The freshness of the carbonated beverage may be lost with each serving, resulting in a unpleasant consumption experience.

Further, dispensing the carbonated beverage may cause foaming. The amount of foaming may depend on the rate at which the carbonated beverage is dispensed. Traditional multi-serve packages may lack a sufficient foam control mechanism. Rather, traditional multi-serve packages may leave the burden of controlling foaming during the dispensing of the carbonated beverage on the consumer. As a result, the consumer has to be careful each time the beverage is dispensed not to cause excessive foaming.

On the basis of the foregoing, there exists a need for a technology that may facilitate appropriate flow control to minimize foaming of the carbonated beverage. Further, there exists a need for a technology that may facilitate maintaining the freshness of the carbonated beverage at all times, especially between consecutive servings.

SUMMARY

Disclosed are a system, a method and an apparatus for dispensing carbonated beverages from a closed package. In one aspect, an apparatus includes a first pressure regulator that can be configured to reduce a pressure of a gas from a first pressure to a second pressure. The input of the first pressure regulator can be coupled to a cartridge comprising the gas. Further, the apparatus includes a second pressure regulator that can be coupled to the output of the first pressure regulator. The second pressure regulator may be configured to reduce a pressure of the gas from the second pressure to a third pressure. In addition, the apparatus includes a flow regulator that can be coupled to the output of the second pressure regulator. The flow regulator can be configured to regulate the flow of the gas having the third pressure which may be released into a closed container. The closed container can be adapted to be coupled to the flow regulator and comprise a carbonated beverage. The flow regulator can regulate the gas flow such that the carbonated beverage is dispensed at a controlled flow rate. Further, the apparatus includes a dispensing head coupled to the output of the flow regulator. The closed container comprising the beverage can be coupled to the dispensing head. Using a snifting valve of the dispensing head, the dispensing head can be configured to stabilize a pressure inside the closed container to an atmospheric pressure associated with the external environment of the closed container.

In another aspect, a method includes releasing, by a snifting valve, a pressure from a container comprising a carbonated beverage to substantially equalize the pressure inside the container to an atmospheric pressure prior to dispensing the carbonated beverage. Responsive to substantially equalizing the pressure the method includes, controlling by the snifting valve, a position of a dispensing valve sequentially coupled to the snifting valve, to create an opening for the carbonated beverage to be dispensed from the container. Further, the method includes building, based on a sequential combination of a first pressure regulator, a second pressure regulator and a flow regulator, a dispensing pressure inside the container to dispense the carbonated beverage to another container at a controlled flow rate.

In yet another aspect, a method includes regulating, by a sequential combination of one or more pressure regulators and a flow control valve, the rate of flow of a gas and a pressure of the gas from a cartridge to a closed container. The closed container can be adapted to be coupled to the sequential combination via a dispensing head. Further, the closed container can be adapted to hold a beverage. The sequential combination can regulate the flow rate of the gas such that the beverage is dispensed from the closed container at a desired flow rate. In addition, the method includes stabilizing, by a snifting valve of the dispensing head, a pressure inside the closed container to an ambient atmospheric pressure associated with the external environment of the closed container prior to dispensing the beverage.

In a further aspect, a method includes changing, by a first pressure regulator, a pressure of a gas from a first pressure to a second pressure. Further, the method includes changing, by a second pressure regulator coupled to the first pressure regulator, a pressure of the gas from the second pressure to a third pressure. In addition, the method includes regulating, by a flow regulator coupled to the second pressure regulator, the flow of the gas having a third pressure to dispense a carbonated beverage comprised in the container at a controlled flow rate.

In another aspect, a method includes reducing, by a first pressure regulator, a pressure of a gas from a first pressure to a second pressure. Further, the method includes reducing, by a second pressure regulator coupled to the first pressure regulator, the pressure of the gas from the second pressure to a third pressure. In addition, the method includes regulating, by a flow regulator coupled to the second pressure regulator, the flow of the gas having a third pressure to dispense a carbonated beverage from a container to another container such that a foaming generated by dispensing the carbonated beverage to the other container is controlled. The regulated gas from the flow regulator may be delivered into the container. Further, the container may be adapted to be coupled to the flow regulator and to hold a carbonated beverage.

The foregoing discussion of dispensing carbonated beverage from a closed package is for illustrative purposes only. Various aspects may be more clearly understood and appreciated from a review of the following detailed description of the disclosed embodiments and by reference to the drawings and the claims that follow. Moreover, other aspects, systems, methods, features, advantages, and objects of the present invention will become apparent to one with skill in the art upon examination of the following drawings and detailed description. It is intended that all such aspects, systems, methods, features, advantages, and objects are to be included within this description, are to be within the scope of the embodiments, and are to be protected by the accompanying claims.

BRIEF DESCRIPTION OF DRAWINGS

Example embodiments are illustrated by way of example and not limitation in the figures of accompanying drawings, in which.

Figure 1:
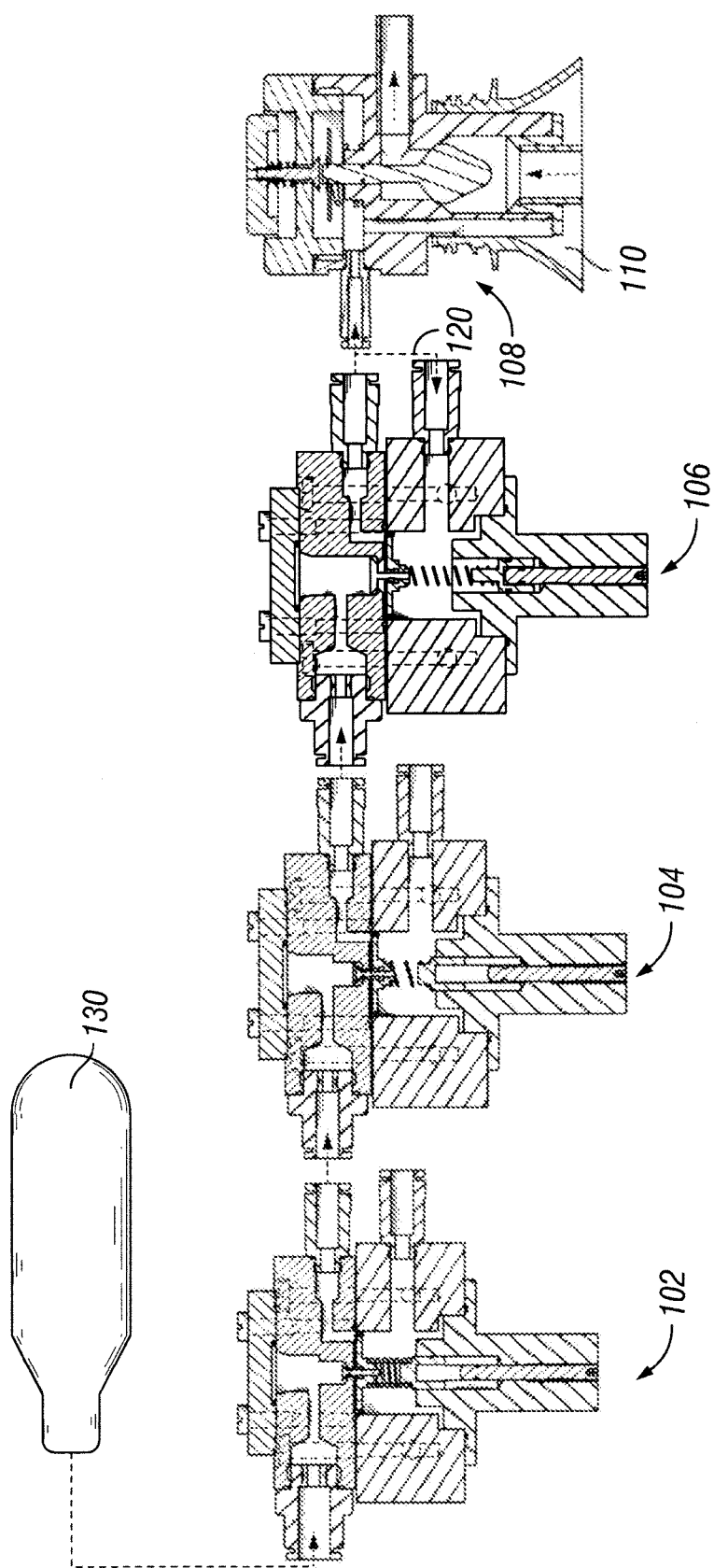
FIG. 1 illustrates a system for dispensing a carbonated beverage from a closed package, according to one or more exemplary embodiments.

Many aspects of the invention can be better understood with reference to the above drawings. The elements and features shown in the drawings are not to scale, emphasis instead being placed upon clearly illustrating the principles of exemplary embodiments of the present invention. Moreover, certain dimensions may be exaggerated to help visually convey such principles. In the drawings, reference numerals designate like or corresponding, but not necessarily identical, elements throughout the several views. Other features of the present embodiments will be apparent from the Detailed Description that follows.

DETAILED DESCRIPTION

Disclosed is a method, apparatus and system for dispensing carbonated beverage from a closed package. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

The term "closed package" as used herein, may generally refer to any appropriate container adapted to hold a beverage and in which substantially no air can get in other than when a beverage in the container is poured out. In an example embodiment, the closed package (hereinafter "closed container") may be an air-tight container. In another example embodiment, the closed package may be a multi-serve package. In yet another example embodiment, the closed container may be a mass deliverable PET bottle (e.g., 2 liter bottle). Further examples of closed containers, without being exhaustive, may include a glass bottle, and/or a can.

The term 'headspace' as used herein may refer to a volume in the closed container that is not filled by the beverage. For example, the headspace in a vertically standing closed container may refer to a space between the level of beverage in the closed container and the top enclosure of the closed container.

In one embodiment, the headspace may increase as the beverage level in the closed container reduces.

In one embodiment, regulating the rate at which a carbonated beverage is dispensed (e.g., poured into another container, such as a serving glass or drinking glass) may facilitate reducing excessive foaming when the carbonated beverage is poured into a container. Further, regulating the rate at which a carbonated beverage is dispensed can facilitate obtaining a desired beverage to foam ratio. In an example embodiment, a desired beverage (carbonated) to foam ratio may be 80/20. In another example embodiment, the ratio may be 90/10. In yet another example, the ratio may be 95/5.

Further, each time the carbonated beverage is dispensed, a volume of the carbonated beverage compared to the volume of the closed container may change. Specifically, the volume of carbonated beverage in the closed container may reduce. Reducing the carbonated beverage in the closed container may increase a headspace volume. In other words, the volume of carbonated beverage that is dispensed from the closed container may create an empty volume in the closed container that is substantially equal to the volume of carbonated beverage that has been dispensed. In one embodiment, the empty volume created by dispensing the carbonated beverage may be replaced to maintain a pressure equilibrium between the remaining carbonated beverage and the headspace. The empty volume (e.g., increased headspace) may be filled by:

a) releasing dissolved gas from the remaining carbonated beverage in the closed container, and/or b) releasing an appropriate gas to the closed container from an external source.

When the increased headspace is filled by releasing the gas dissolved in the carbonated beverage each time the carbonated beverage is dispensed, a freshness of the carbonated beverage may be affected. In one embodiment, the freshness of the carbonated drink may be based on at least the carbonation level or the amount of dissolved gas in the carbonated beverage. Accordingly, a release of the dissolved gases to fill the increased headspace each time the carbonated beverage is dispensed may compromise a freshness of the carbonated beverage. To minimize the release of the dissolved gas from the carbonated beverage, the headspace can be filled with an appropriate gas from an external source.

FIG. 1 illustrates a system for dispensing a carbonated beverage from a closed package, according to one or more exemplary embodiments. In particular, FIG. 1 illustrates a cartridge 130, a first pressure regulator 102, a second pressure regulator 104, a flow regulator 106, a dispensing head 108 and a closed container 110.

In the example embodiment of FIG. 1, the pressure regulators 102, 104 are sequentially coupled to a flow regulator, which is coupled to the dispensing head 108. In one embodiment, the dispensing head 108 may facilitate serving the carbonated beverage from the closed container. In another embodiment, the dispensing head 108 may facilitate reducing a headspace pressure in the closed container 110 to the ambient atmospheric pressure at a controlled rate. Further, the pressure regulators 102, 104 and the flow regulator 106 may facilitate controlling the pressure and flow rate of a gas to the closed container. The gas may be supplied to the closed container from an external source, such as a cartridge 130 coupled to the first pressure regulator 102.

The cartridge 130 may include a gas at a first pressure. The gas in the cartridge 130 may be compressed and stored in a liquid state. Storing the gas in a liquid state may facilitate storage of higher mass of the gas in a reasonable volume of the cartridge 130. In an example embodiment, the gas may be carbon dioxide ($CO_2$). The pressure of the gas in the cartridge (in liquid form) may be associated with a temperature at which the cartridge is maintained. For example, for CO2 gas stored in the form of liquid, a temperature range of 5-30 degree Celsius may reflect a pressure range of 30-70 bar (absolute). In one embodiment, the gas in the liquid state may transform to a gaseous state when the gas in liquid state is released from the cartridge 130.

In one embodiment, the gas at the first pressure may be fed (e.g., from the cartridge 130) to the first pressure regulator 102 coupled to cartridge 130. The first pressure regulator 102 can reduce the pressure of the gas (e.g., first pressure) to a second pressure. The gas having the second pressure may be fed to a second pressure regulator 104 coupled sequentially to the first pressure regulator 102 to further reduce the pressure of the gas (e.g., second pressure) to a third pressure.

The pressure of the gas may be stepped down to achieve a controllable pressure at which a flow of the gas can be regulated. Stepping down the pressure using more than one pressure regulator may facilitate precise control in stepping down the pressure of the gas from the cartridge. In some embodiments, the one or more pressure regulators may be replaced by a single pressure regulator. The operation and structure of the pressure regulators 102, 104 may be described in greater detail in association with FIGS. 2 and 3.

Figure 2:
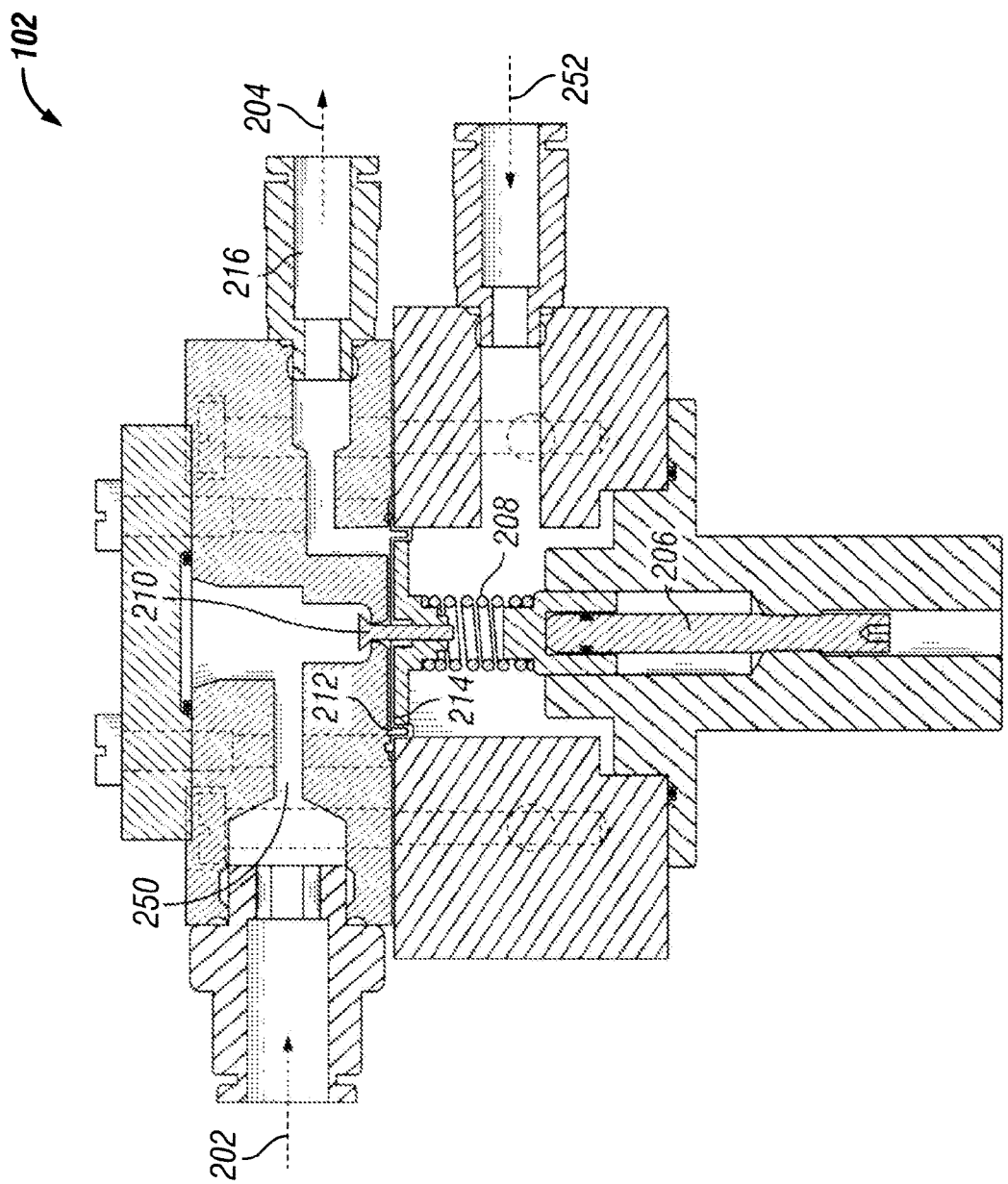
FIG. 2 illustrates an exploded view of a first pressure regulator, according to one or more exemplary embodiments.

Referring now to FIG. 1 and FIG. 2, FIG. 2 illustrates an exploded view of a first pressure regulator, according to one or more exemplary embodiments. The operation of the pressure regulator 102 may be described briefly in the following paragraphs. The operation of a pressure regulator is well known to one of ordinary skill in the art. Further, one or ordinary skill in the art would appreciate and understand that the example embodiment of pressure regulator 102 illustrated in FIG. 2 can be replaced by any other appropriate pressure regulator or functionally equivalent device without departing from the broader spirit of the invention.

The first pressure regulator 102 may reduce the pressure of a gas from the cartridge 130 to a second pressure. Using an input chamber 250, the gas having a first pressure may be received by the pressure regulator 102. In one embodiment, a desired second pressure after pressure regulation may be set by using the spring 208 coupled to the screw 206. The screw 206 may be adjusted to set the spring 208 at a desired tension which may define the second pressure of the gas. Further, the spring 208 may control an operation of the valve 210 that is associated with the pressure regulation mechanism. The position of the valve 210 determines an access to a pressure chamber 212.

The pressure chamber 212 may include a diaphragm 214 that moves vertically along the pressure chamber 212 based on a pressure of the gas received at the input chamber 250. In the embodiment illustrated in FIG. 2, the pressure chamber 212 is located above the diaphragm 214 and the flow of gas from the input chamber 250 to the pressure chamber 212 is controlled by the valve 210. In an alternate embodiment, the diaphragm 214 may move horizontally, diagonally, or in any appropriate direction as per the design of the pressure regulator. In an example embodiment, rolling diaphragms may be used to prevent stick slip effect (i.e., a spontaneous jerking motion) which may affect a smooth dispensing of the carbonated beverage. In one embodiment, the diaphragm 214 may be coupled to a spring 208 that regulates the amount of gas passing through the valve. In one embodiment, the diaphragm 214 may be balanced against outside atmospheric pressure 252. Balancing the diaphragm 214 against the atmospheric pressure 252 may facilitate determining the increase and/or decrease in pressure and operate the valve 210 accordingly.

When the gas pressure is more than what the spring can handle, the diaphragm 214 overcomes the spring 208 and the spring 208 is compressed. Contracting the spring 208 may cause the valve 210 to move down such that an opening to the pressure chamber 212 is closed. Moving the valve 210 to the closed position may prevent additional gas from entering the pressure chamber 212. The pressure chamber 212 may stay closed if the pressure is over a pre-determined value. The foregoing process may reduce the pressure of the gas from a first pressure to a second pressure. The gas having the second pressure may be output from the pressure chamber 212 and through an output channel 216. When pressure is regulated, the valve 210 may open gradually.

Figure 3:
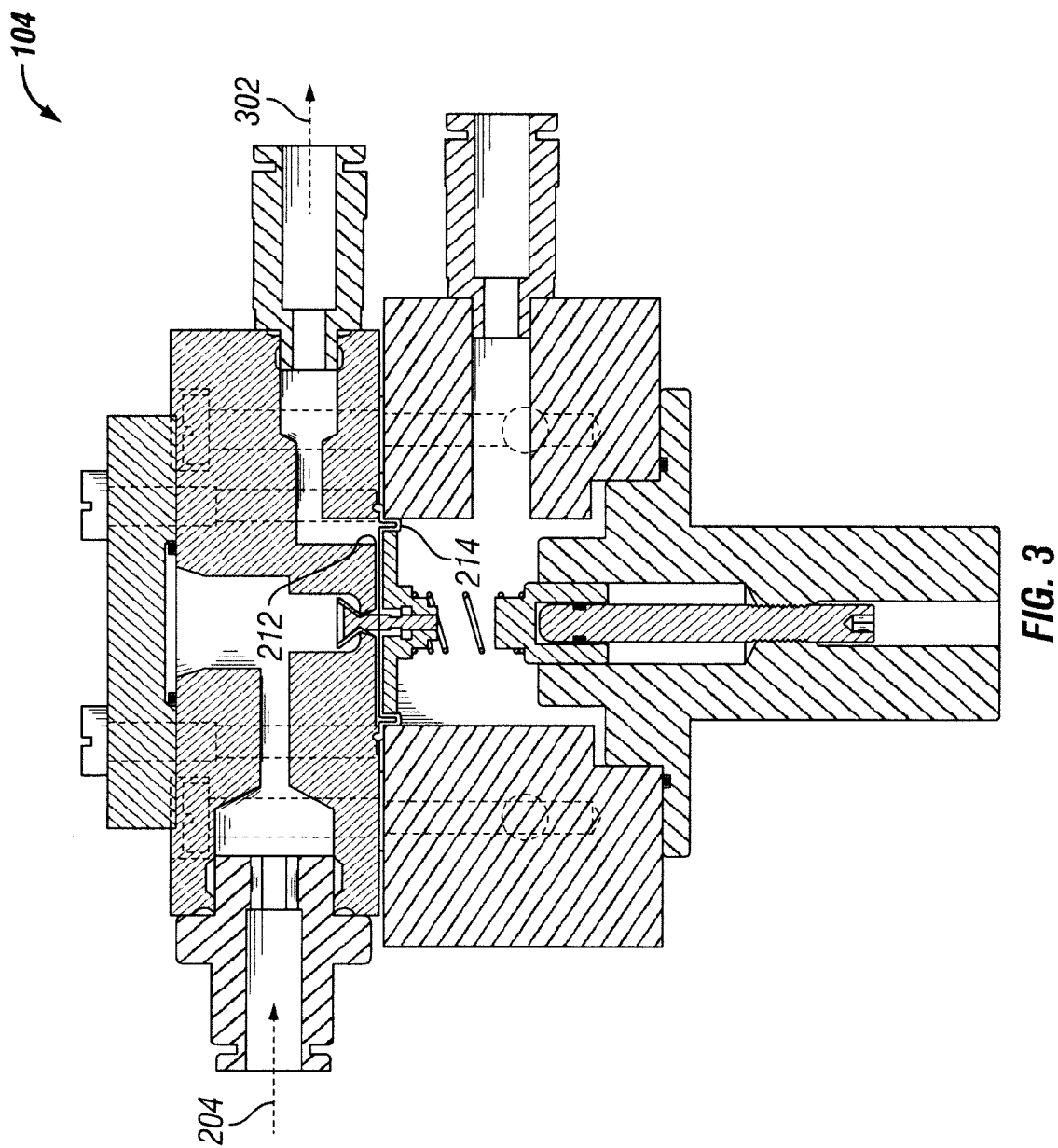
FIG. 3 illustrates an exploded view of a second pressure regulator, according to one or more exemplary embodiments.

Referring now to FIG. 1, FIG. 2 and FIG. 3, FIG. 3 illustrates an exploded view of a second pressure regulator, according to one or more exemplary embodiments. The second pressure regulator 104 may be similar to the first pressure regulator 102 except for the setting of the spring. The spring in the second pressure regulator 104 may be set such that the pressure of the gas having a second pressure may be reduced to a third pressure. The operation of the second pressure regulator 104 may be similar to that of the first pressure regulator 102. The second pressure regulator 104 may reduce the pressure of the gas from the first pressure regulator 102 to a third pressure.

Referring back to FIG. 1, the gas at the third pressure may be fed into a flow regulator 106 that controls the flow of the gas into the closed system. In one embodiment, using a feedback mechanism 120 illustrated in FIG. 1, the flow regulator 106 may maintain a desired flow rate of the gas through an output of the flow regulator 106. In one embodiment, the flow rate of the gas through the flow regulator 106 may be regulated independent of the pressure condition on an exterior of the closed container 110. In another embodiment, the flow rate of the gas may be regulated independent of a quantity of carbonated beverage inside the closed container 110. In one embodiment, one or more components of the flow regulator may be mechanically preset to achieve the desired flow rate. In another embodiment, the desired flow rate may be dynamically controlled by setting the components electronically with or without software assistance. For example, the screw position and the spring setting may be pre-adjusted mechanically or adjusted dynamically using electronic controls.

Maintaining a desired flow rate of the gas may facilitate controlling of the dispensing rate of the carbonated beverage from the closed container 110. Further, when the carbonated beverage is not being dispensed, the gas from the cartridge 130 (regulated by the pressure regulator) can fill the headspace to maintain a pressure equilibrium in the closed container between the headspace pressure and pressure of dissolved gas in the carbonated beverage. In one embodiment, maintaining the equilibrium may aid in maintaining the freshness of the carbonated beverage by preventing an undesired escape of dissolved gas in the carbonated beverage to fill the headspace. In another embodiment, maintaining the equilibrium may facilitate preserving a desired carbonation level of the carbonated beverage in the closed container 110. The flow regulator 106 may be described in further detail in association with FIG. 4.

Referring now to FIG. 1-3 and FIG. 4, FIG. 4 illustrates an exploded view of a flow regulator, according to one or more exemplary embodiments.

The operation of the flow regulator 102 may be described briefly in the following paragraphs. The operation of a flow regulator is well known to one of ordinary skill in the art. Further, one or ordinary skill in the art would appreciate and understand that the example embodiment of flow regulator

Figure 4:
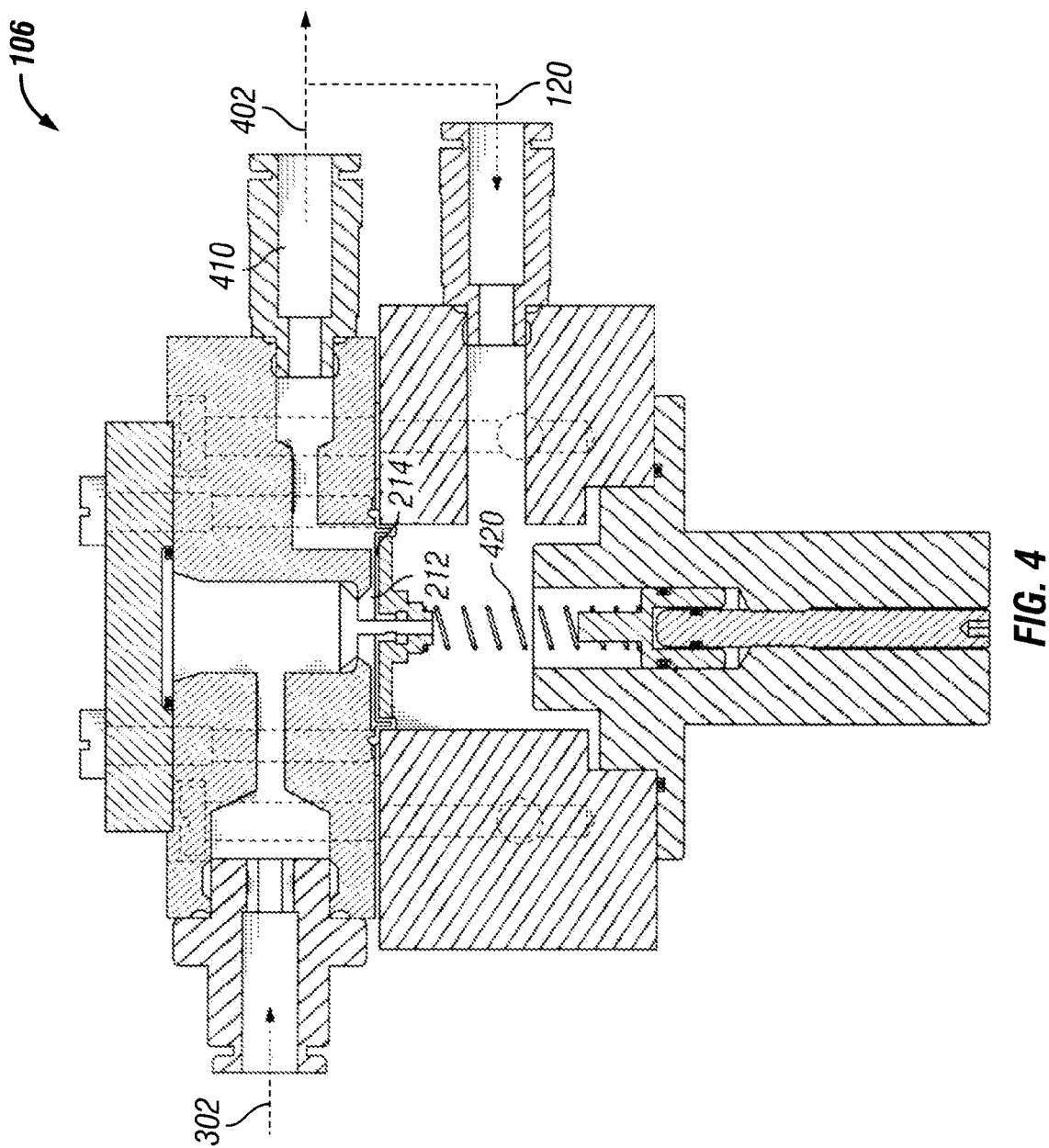
FIG. 4 illustrates an exploded view of a flow regulator, according to one or more exemplary embodiments.

106 illustrated in FIG. 4 can be replaced by any other appropriate flow regulator, flow control valve or functionally equivalent device without departing from the broader spirit of the invention.

In an example embodiment, the flow regulator 106 is configured to allow X volume-units/minute of gas to pass through the flow regulator. As gas flows through the flow regulator 106, the gas may experience a pressure drop between the gas pressure at the pressure chamber 212 and the gas pressure at the output of the flow regulator 106 (e.g., regulated flow of gas 402). The pressure chamber 212 may be above the diaphragm 214 as illustrated in FIG. 4. The pressure drop may depend of the gas flow rate and/or design of the flow regulator 106. In one embodiment, the feedback mechanism 120 can be operable to ensure that the regulating spring 420 controls the pressure difference. Each gas flow rate may have a different pressure drop associated with the flow rate. So, by controlling the pressure difference (drop), the flow regulator 106 can control the flow rate of the gas. In other words, the flow regulator 106 may control the flow rate of the gas using the feedback mechanism 120.

In an example embodiment, the flow regulator may be a delta P regulator in series with an output flow channel 410. In the example embodiment of FIG. 4, using a feedback mechanism 120, the pressure on both sides of the output flow channel 410 may be sensed to maintain a specific delta P flow rate across the output flow channel 410. In some embodiments, the output flow channel 410 may be insensitive to changes in input pressure (e.g., gas at third pressure 302). In another example embodiment, a flow regulator 106 may have a feedback pressure regulator and a controlled orifice to the output chamber coupled in series.

The gas from the flow regulator 106 may be delivered to the closed container 110 coupled to the flow regulator 106 at a desired flow rate, to dispense a beverage (e.g., carbonated beverage) from the closed container 110.

While dispensing, there may be a constant and smooth delivery of gas, at a desired rate, to the closed container through the pressure regulators 102, 104, flow regulator 106 and the dispensing head 108. In one embodiment, the gas from the cartridge 130 may be released based on the desired operation in the closed container, such as dispensing the carbonated beverage and/or maintaining freshness of the carbonated beverage. After the dispensing of the carbonated beverage stops, the flow regulator 106 may remain open till the headspace pressure of the bottle reaches the pressure equivalent to the pressure of the gas at the output of the second pressure chamber i.e. third pressure. After each dispensing, the headspace pressure of the bottle may be brought to the pressure of the gas at the output of the second pressure regulator to maintain minimum carbonation level in the bottle. Once the headspace of the bottle reaches the third pressure, the gas flow through the flow regulator 106 may stop. Dispensing the carbonated beverage may be discussed in greater detail in association with FIG. 5 and FIG. 6.

Figure 5:
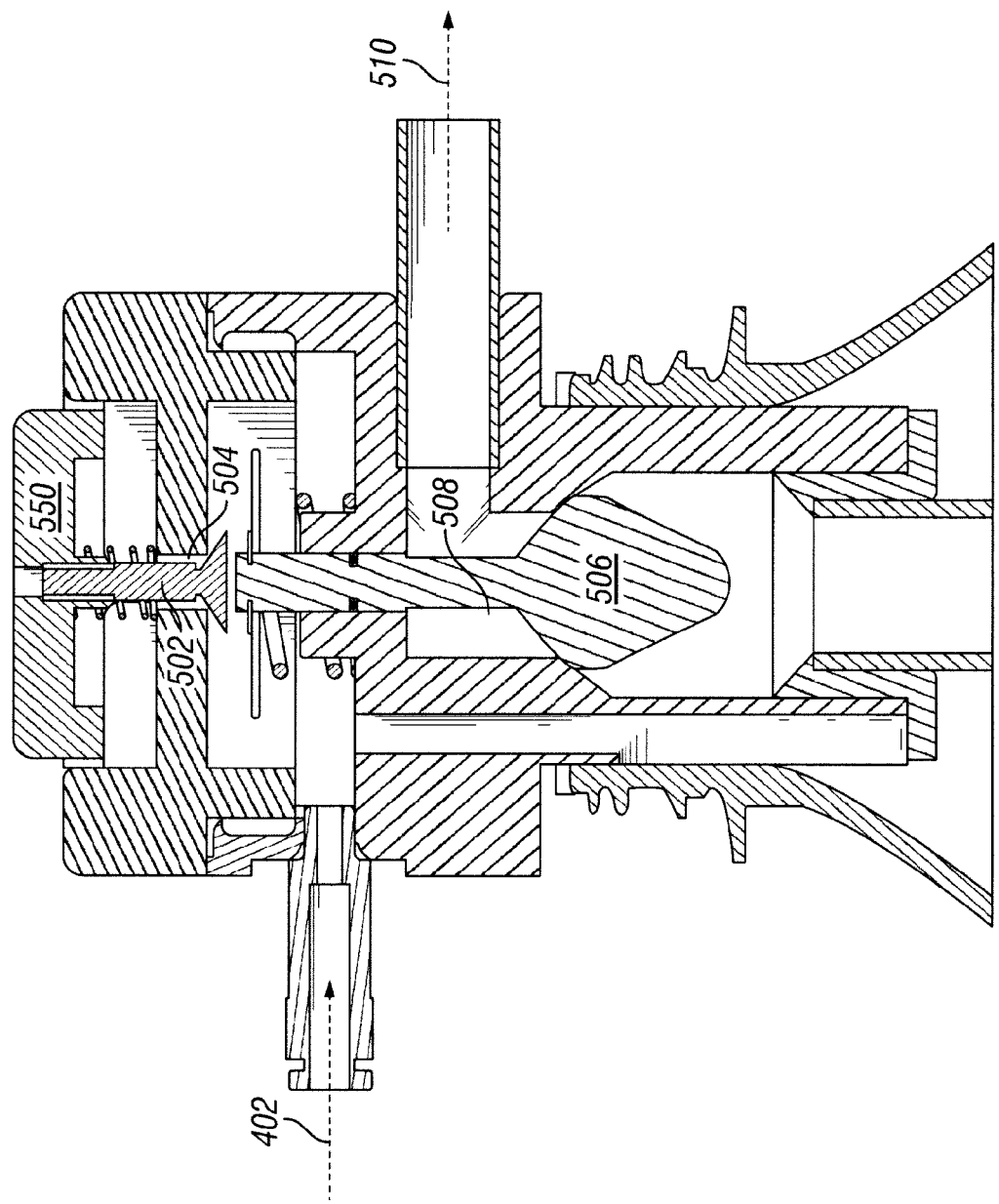
FIG. 5 illustrates an exploded view of a dispensing head, according to one or more exemplary embodiments.

Referring now to FIG. 1 and FIG. 5, FIG. 5 illustrates an exploded view of the dispensing head 108, according to one or more exemplary embodiments. In particular, FIG. 5 illustrates, a snifting valve 502, a snifting vent 504, a regulated flow of gas 402, a dispensing valve 506, a dispensing vent 508 and carbonated beverage flow path 510.

In the example embodiment of FIG. 5, the dispensing head 108 may include inter alia, a snifting valve 502 and a dispensing valve 506. The snifting valve 502 and the dispensing valve 506 may be arranged sequentially as illustrated in FIG. 5, such that a movement of the snifting valve 502 may sequentially trigger a movement of the dispensing valve 506. The operation of the snifting valve 502 and the dispensing valve 506 may be described in association with FIG. 6.

Figure 6:
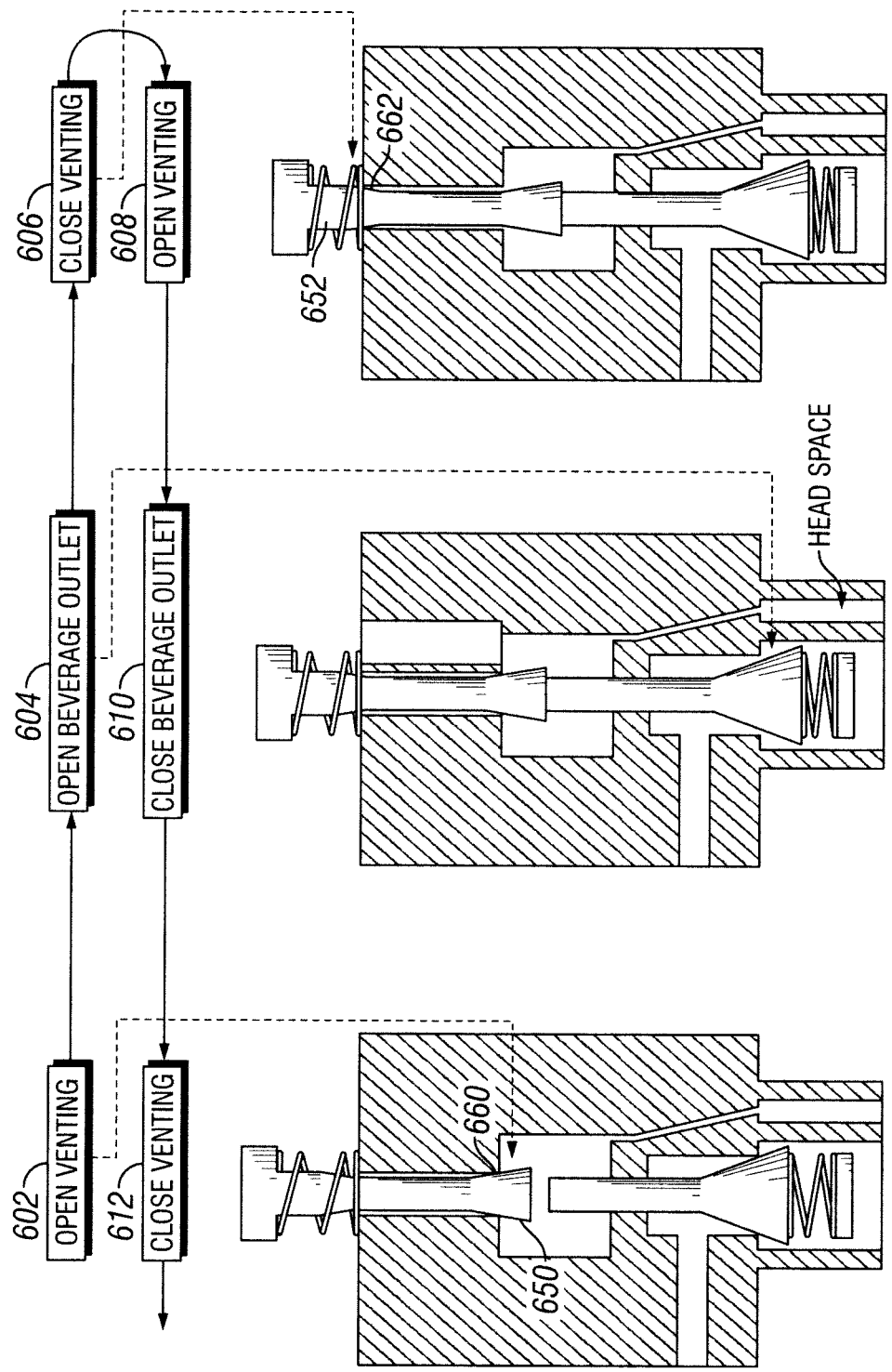
FIG. 6 illustrates a method of dispensing carbonated beverage from a closed package, according to one or more exemplary embodiments.

Referring now to FIGS. 1, 5 and 6, FIG. 6 illustrates the steps or operations of a method of dispensing a carbonated beverage from a closed package, according to one or more exemplary embodiments. In alternate embodiments, certain of the operations shown in FIG. 6 may be modified or removed. In operation 602 of FIG. 6, the snifting valve 502 may be controlled to open the snifting vent 504. In an example embodiment, a snifting valve may be coupled to a spring mechanism associated with dispensing head 108. In another example embodiment, the snifting valve 502 may be embodied in the dispensing head such that a user can trigger a movement of the snifting valve 502.

In an example embodiment, a user may press a push button 550 coupled to a spring to which the snifting valve 502 is coupled. Pressing the push button may facilitate moving the snifting valve 502 in a direction of the push. The pressure applied on the push button may be proportional to an extent of movement of the snifting valve 502. In an initial position and orientation of the snifting valve 502, the snifting vent 504 may be rendered closed. Once the snifting valve 502 moves a certain distance, the snifting valve may facilitate opening the snifting vent 504. Once the snifting vent 504 is opened, the headspace pressure and/or the pressure in the closed container may be reduced to be substantially equal to the ambient atmospheric pressure.

The snifting valve 502 may include a first cone 650 and a second cone 652 used to close the snifting vent 504 as illustrated in FIG. 6. The first cone 650 may seal the bottle head space from the environment by closing the snifting vent 504 at a first position 660 (e.g., from bottom while the push button is not pressed as shown in operation 602). Further the second cone 652 may seal the bottle head space from the environment from a second position 662 (e.g., from top while the push button 550 is pressed all the way as shown in operation 606). One of ordinary skill in the art would appreciate and understand that the example embodiment of first cone 650 and the second cone 652 illustrated in FIG. 6 can be replaced by any other appropriate functionally equivalent structures that can be used for closing and opening a vent without departing from the broader spirit of the invention.

The snifting valve 502 mechanism may be configured in such a way that the headspace pressure and/or the pressure in the closed container may be substantially reduced to the atmospheric pressure at a desired rate and/or within a desired time period. In an example embodiment, the snifting valve 502 may be configured to stabilize the pressure in the closed container to the atmospheric pressure in 300 ms. In another example embodiment, the snifting valve 502 may be configured to stabilize the pressure in the closed container to the atmospheric pressure in 200 ms-300 ms. The desired time period for stabilizing the pressure inside the closed container 110 to the ambient atmospheric pressure may depend upon the beverage, the carbonation level of the beverage and/or the temperature of the beverage.

In operation 604, after opening the snifting vent 504, the snifting valve 502 may trigger a movement of the dispensing valve 506 such that a dispensing vent 508 is opened. In one embodiment, the dispensing head 108 may be configured such that the time taken for the snifting valve 502 to move from initial position and orientation to triggering a movement in the dispensing valve may be substantially equivalent to the desired time period for stabilizing the pressure in the closed container 110 to the atmospheric pressure.

In operation 606, after the dispensing vent 508 is opened, the snifting vent 504 may be closed by an appropriate design of the snifting valve 502 (e.g., using second cone 652). In one embodiment, the snifting valve 502 may be configured to close the snifting vent 504 once the pressure inside the closed container has been substantially stabilized to the ambient atmospheric pressure, the dispensing vent 508 has been opened or a combination of both. Further, closing the snifting vent 504 may aid in creating a dispensing pressure using the gas from the cartridge 130 which is fed into the closed container at a regulated flow rate. The dispensing pressure may facilitate dispensing the carbonated beverage inside the closed container at a controlled flow rate. In one embodiment, the flow rate associated with dispensing the beverage may depend on the flow rate at which the gas from the cartridge 130 is fed into the closed container 110. In an alternate embodiment, the flow rate associated with dispensing the beverage may depend on the pressure regulation and the flow regulation of the gas from the cartridge 130.

In operation 608, when a desired amount of carbonated beverage is dispensed, the snifting vent 504 may be opened. If the snifting vent 504 remains closed while the dispensing vent 508 is closing, then the head space pressure inside the bottle may increase resulting in foaming. In one embodiment, the snifting vent 504 may be opened responsive to releasing a pressure on the push button to which the snifting valve 502 is coupled. Opening the snifting vent 504 may drop the dispensing pressure. Dropping the dispensing pressure may facilitate stopping the dispensing of the carbonated beverage. In one embodiment, a user may control when the dispensing of the carbonated beverage may be stopped. In another embodiment, the dispensing of the carbonated beverage may be stopped responsive to external factors, reaching a pre-set time limit, a level of the beverage in the closed container and/or a volume of beverage dispensed.

In operation 610, the dispensing vent 508 may be closed responsive to opening the snifting vent 504. The snifting vent 504 may be opened based on a movement of the snifting valve 502 and a movement of the snifting valve 504 may cause a movement of the dispensing valve 506, which in turn may cause the dispensing vent 508 to close. In operation 612, responsive to closing the dispensing vent 508, the snifting vent 504 may be closed.

In an example embodiment, releasing pressure on the push button may cause the dispensing valve 506 to push upwards closing the dispensing vent 508. Further, the dispensing valve 506 may push the snifting valve 502 upwards resulting in closing the snifting vent 504. In another example embodiment, releasing pressure on the push button may cause the snifting valve 502 to push upwards resulting in the upward movement of the dispensing valve 504. One of ordinary skill in the art, may understand and appreciate that even though a push button and spring mechanism are mentioned in this description, the push button and spring mechanism may be replaced by any other appropriate mechanisms that facilitate sequential operation of the snifting valve 502 and dispensing valve 504 to dispense the carbonated beverage.

In an example embodiment, the carbonated beverage may be maintained at an appropriate temperature ranging from 3 degrees Centigrade to 30 degrees Centigrade. The nominal temperature for usage of the carbonated beverage may be approximately 5 degree Centigrade. In an example embodiment, the pressure of the gas in the cartridge 120 may range from 4 bar to 70 bar. In another embodiment, the pressure of a CO2 cartridge may depend on cartridge content, beverage container content and number of servings wanted. For a 2.5 l bottle and given serving scenario the pressure of the CO2 cartridge ranges from 44 mbar to 383 mbar depending on cartridge size (8 gr-32 gr). At the specified temperature range of the carbonated beverage, the sequential combination of the pressure regulators and the flow regulator may be configured to dispense the carbonated beverage at approximately 20-30 ml/s (0.7-1 US fl oz/s). Further, the typical headspace pressure for dispensing the carbonated beverage may be approximately in the range between 5 to 30 mbar. The first pressure regulator may reduce the pressure of the gas in the cartridge 120 from a first pressure (4 bar-70 bar) to a second pressure ranging from 1.2 bar to 73 mbar. Further, the gas having the second pressure may be reduced to a third pressure ranging from 47 mbar to 43 mbar which may be used to create a constant gas flow independent of a typical bottle headspace pressure of 3 mbar to 30 mbar.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

The invention claimed is:

1. A method comprising:
reducing, by a first pressure regulator, a pressure of a gas from a first pressure to a second pressure;
reducing, by a second pressure regulator coupled to the first pressure regulator, the pressure of the gas from the second pressure to a third pressure;
regulating, by a flow regulator coupled to the second pressure regulator, a rate of flow of the gas having the third pressure and delivered into a container, adapted to be coupled to the flow regulator and adapted to hold a carbonated beverage, so as to dispense the carbonated beverage to another container such that a foaming generated by dispensing the carbonated beverage to the another container is controlled; and
stopping the dispensing of the carbonated beverage by opening a snifting vent of a dispensing head coupled to the flow regulator and the container in order to release a dispensing pressure associated with dispensing the carbonated beverage from the container to the another container.

2. The method of claim 1, further comprising:
substantially equalizing, by a snifting valve of the dispensing head, a pressure inside the container to an atmospheric pressure by a controlled releasing of the pressure inside the container prior to releasing the gas into the container for dispensing the carbonated beverage.

3. The method of claim 1, further comprising creating, by a snifting valve of the dispensing head, the snifting vent for controlled releasing of a pressure inside the container.

4. The method of claim 3, further comprising: responsive to closing the snifting vent, building, based on the gas delivered into the container, the dispensing pressure inside the container to dispense the carbonated beverage to the another container.

5. The method of claim 1, further comprising: responsive to closing the snifting vent, controlling, by a snifting valve of the dispensing head, a position of a dispensing valve of the dispensing head to create an opening for the carbonated beverage to be dispensed from the container.

6. The method of claim 1:
wherein the first pressure regulator is coupled to a capsule comprising the gas in liquid state,
wherein the container is a closed container, and
wherein the flow regulator is coupled to the closed container.

7. The method of claim 1, further comprising: regulating, by the flow regulator, the rate of flow of the gas delivered into the container such that the carbonated beverage is dispensed at a desired flow rate.

8. The method of claim 1, further comprising: regulating, by the flow regulator, the rate of flow of the gas delivered into the container independent of at least one of a pressure condition on an exterior of the container and a quantity of carbonated beverage inside the container.

9. A method comprising:
releasing, by a snifting valve, a pressure from a container comprising a carbonated beverage to substantially equalize the pressure inside the container to an atmospheric pressure prior to dispensing the carbonated beverage;
responsive to substantially equalizing the pressure, controlling, by the snifting valve, a position of a dispensing valve sequentially coupled to the snifting valve to create an opening for the carbonated beverage to be dispensed from the container; and
building, based on a sequential combination of a first pressure regulator, a second pressure regulator and a flow regulator, a dispensing pressure inside the container to dispense the carbonated beverage to another container at a controlled flow rate.

10. A method comprising:
regulating, by a sequential combination of one or more pressure regulators and a flow control valve, a rate of flow of a gas and a pressure of the gas from a cartridge to a closed container to dispense a beverage from the closed container at a desired flow rate, wherein the closed container is adapted to be coupled to the sequential combination via a dispensing head and adapted to hold the beverage;
stabilizing, by a snifting valve of the dispensing head, a pressure inside the closed container to an ambient atmospheric pressure associated with an external environment of the closed container prior to dispensing the beverage; and
stopping, by the snifting valve, the dispensing of the carbonated beverage by opening a snifting vent of a dispensing head in order to release a dispensing pressure associated with dispensing the carbonated beverage from the closed container.

11. The method of claim 10, further comprising: filling, between consecutive dispensings of the carbonated beverage, at least a portion of a volume of the closed container with the gas from the cartridge that is pressure regulated and flow regulated by the sequential combination of one or more pressure regulators and the flow control valve to maintain a freshness of the beverage.

12. An apparatus comprising:
a first pressure regulator configured to reduce a pressure of a gas from a first pressure to a second pressure;
a second pressure regulator coupled to the first pressure regulator configured to reduce the pressure of the gas from the second pressure to a third pressure;
a flow regulator coupled to the second pressure regulator configured to regulate a flow of the gas having the third pressure released into a closed container that is to be coupled to the flow regulator and comprising a carbonated beverage, to dispense the carbonated beverage at a controlled flow rate; and
a dispensing head coupled to the flow regulator configured to stabilize, by a snifting valve of the dispensing head, a pressure inside the closed container to an atmospheric pressure associated with an external environment of the closed container,
wherein the snifting valve is operable to substantially equalize the pressure inside the closed container to the atmospheric pressure by a controlled releasing of the pressure inside the closed container prior to dispensing the carbonated beverage in the closed container,
wherein the snifting valve is operable to create an opening for the controlled releasing of the pressure inside the closed container, and
wherein the snifting valve is adapted to close the opening when the pressure inside the closed container is substantially equalized to the atmospheric pressure.

13. The apparatus of claim 12, wherein the dispensing head comprises a dispensing valve that is sequentially coupled to the snifting valve.

14. The apparatus of claim 12, wherein responsive to closing the opening, the snifting valve is operable to control a position of a dispensing valve to create an opening for the carbonated beverage to be dispensed from the closed container.

15. The apparatus of claim 12 wherein responsive to closing the opening, the flow regulator is operable to build a dispensing pressure inside the closed container to dispense the carbonated beverage to another container.

16. The apparatus of claim 12 wherein the first pressure regulator is coupled to a capsule comprising the gas having the first pressure.

17. The apparatus of claim 12 wherein the flow regulator is operable to regulate the flow of the gas having the third pressure and delivered into the closed container such that the carbonated beverage is dispensed at a desired flow rate.

18. The apparatus of claim 12 wherein the flow regulator is operable to regulate the flow of the gas having the third pressure independent of at least one of a pressure condition on an exterior of the closed container and a quantity of carbonated beverage comprised inside the closed container.

19. The method of claim 12, wherein the snifting valve is operable to stop the dispensing of the carbonated beverage by creating an opening to release a dispensing pressure that dispenses the carbonated beverage from the closed container to another container.

20. An apparatus comprising:
a first pressure regulator configured to reduce a pressure of a gas from a first pressure to a second pressure;
a second pressure regulator coupled to the first pressure regulator configured to reduce the pressure of the gas from the second pressure to a third pressure;
a flow regulator coupled to the second pressure regulator configured to regulate a flow of the gas having the third pressure released into a closed container that is to be coupled to the flow regulator and comprising a carbonated beverage, to dispense the carbonated beverage at a controlled flow rate; and
a dispensing head coupled to the flow regulator configured to stabilize, by a snifting valve of the dispensing head, a pressure inside the closed container to an atmospheric pressure associated with an external environment of the closed container,
wherein the snifting valve is operable to stop the dispensing of the carbonated beverage by creating an opening to release a dispensing pressure that dispenses the carbonated beverage from the closed container to another container.

* * * * *